United States Patent [19]
Vietzke et al.

[11] 4,367,201
[45] Jan. 4, 1983

[54] EXTRACTION COLUMN FOR FISSIONABLE MATERIAL AND/OR FERTILE MATERIAL

[75] Inventors: Horst Vietzke; Hans Pirk, both of Maintal; Elmar Schlich, Gründau, all of Fed. Rep. of Germany

[73] Assignee: Nukem GmbH, Hanau, Fed. Rep. of Germany

[21] Appl. No.: 196,561

[22] Filed: Oct. 14, 1980

[30] Foreign Application Priority Data

Oct. 13, 1979 [DE] Fed. Rep. of Germany ....... 2941608

[51] Int. Cl.$^3$ .............................................. B01D 11/04
[52] U.S. Cl. ..................................... 422/257; 210/634
[58] Field of Search ..................... 210/634; 423/658.5, 423/DIG. 14; 422/257; 261/113, 110, 81, 82

[56] References Cited
U.S. PATENT DOCUMENTS 2,743,170 4/1956 Burger ................................ 422/257
2,818,324 12/1957 Thornton ............................ 422/257

FOREIGN PATENT DOCUMENTS 197712 5/1976 U.S.S.R. ............................. 422/257
593710 2/1978 U.S.S.R. ............................. 422/257

Primary Examiner—Frank A. Spear, Jr.
Attorney, Agent, or Firm—Cushman, Darby & Cushman

[57] ABSTRACT

Previously known extraction columns for fissionable material (nuclear fuel) and breeder material in the reprocessing of spent fuel elements with pulsation mechanisms working by air impulses, drag along the radioactive aerosols. These difficulties are avoided with the extraction column of the invention in which the column body contains a central tube filled with extraction agent which is connected with a pulsating pump via a multiple part sealing liquid container with the parts joined together according to the principle of communicating tubes.

5 Claims, 1 Drawing Figure

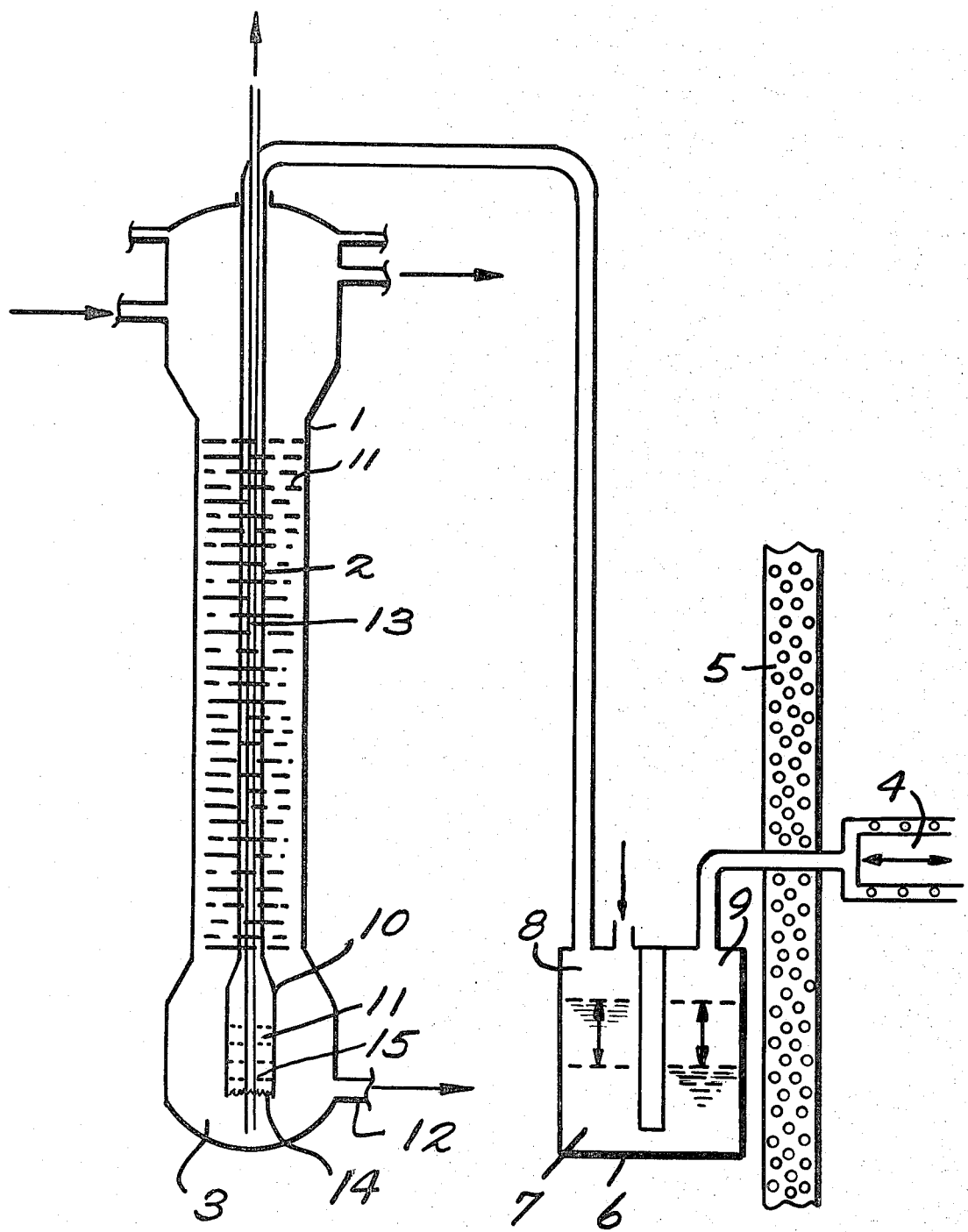

EXTRACTION COLUMN FOR FISSIONABLE MATERIAL AND/OR FERTILE MATERIAL

BACKGROUND OF THE INVENTION

The invention is directed to an extraction column for fissionable and/or breeder material, especially for the reprocessing of spent fuel elements with a pulsation mechanism.

The pulsation of the column thereby can be undertaken hydraulically and the addition of the extraction agent can be undertaken in the form of a dispersion in homogeneous distribution over the cross section of the column. The hydraulic fluid thereby is led over two sealing layers in such manner that normal pulsation pumps can be employed free from contamination, e.g. outside a hot cell.

In the nuclear art, especially in the reprocessing of spent fuel elements, the purification of uranium and plutonium is undertaken by liquid-liquid extraction in pulsated columns.

In order to avoid the installation of moving parts, such as pulsation pumps in hot cells, the columns are normally pulsated through air blasts (50 to 100 m³/h), which in leaving drag along active aerosols. To eliminate the aerosols there are required expensive waste gas purification columns. Furthermore there are difficulties, particularly with large column diameters, in delivering the organic extraction agent solutions, e.g. 30% TBP (tributyl phosphate) and 70% dodecane which feed in at the bottom end of the column during the uniform pulsation over the cross section.

Additionally, all feeding places at the lower part of the column require welded supply pipes whose welding seams are more greatly stressed by corrosion and pulsation, than the smooth column parts and therefore form weak places in the construction of the columns.

Therefore, it was the problem of the present invention to develop an extraction column for fissionable and/or fertile materials, particularly for the reprocessing of spent fuel elements with a pulsation mechanism, in which no active aerosols form during the pulsation and in which in the lower part to the maximum extent possible there are needed no welded supply, withdrawal and pulsation connections, which by corrosion of the welded seams and/or stress crack formation due to the pulsation could represent a weak place in the column.

SUMMARY OF THE INVENTION

This problem was solved according to the invention by the column containing a central tube filled with extraction agent which is connected with a pulsating pump via a multiple part sealing liquid container with the parts joined together according to the principle of communicating tubes.

According to the invention a central tube is introduced into the extraction column through which the pulsation and the feeding in of the extraction agent is undertaken from above, whereby the pulsation is no longer produced by air blasts but by a pulsation pump which can be inactively operated outside the hot cell via a sealing liquid container having two sealing phases.

BRIEF DESCRIPTION OF THE DRAWING

The single FIGURE of the drawing shows schematically an illustrative form of column according to the invention.

Unless otherwise indicated all parts and percentages are by weight.

The apparatus can comprise, consist essentially of or consist of the stated elements.

DETAILED DESCRIPTION

Referring more specifically to the drawing, there is located in column 1 provided with the supply and discharge lines for the various liquids, for example feed solution (for extracting solution) and raffinate a central inlet tube 2 through which there is fed in the extraction agent and the pulsation by means of a pulsation pump 4. In order to make possible the removal of the pulsation pump 4 from the hot cell behind the concrete wall 5 there is interconnected a multiple (plural) part sealing liquid container 6 having, for example, two interconnected hydraulic cylinders. In communicating part 7 of the connecting hydraulic cylinder there is present as heavy sealing liquid, for example, water. In the part 8 connected with the column 1 there is fed in the extraction agent, for example, dodecane containing 30% TBP (tributyl phosphate), which is not miscible with water and forms a phase boundary.

Since this extraction agent can come from the extraction agent wash and is substantially free from fissionable material, there is also prevented a back diffusion of fissionable material out of the extraction column. For the part 9 connected with the pump there is used, for example, pure dodecane up to the pulsation pump 4, which only serves as a diluent for the extraction agent TBP, is not miscible with the sealing liquid and cannot alone take up fissionable material. Preferably the extraction agent is supplied into the column 1 via the container part 8 and the central tube 2.

In the lower part 3 of the column the central feeding/pulsation tube 2 is preferably provided with a widened portion 10, so that the pulsation fluctuations and the migration of the phase boundary only occurs in this widened part 10. By installing the same perforated plates 11 as in the column 1 in the feed tube 2, respectively the widening 10, the extraction agent fed in is diluted with the rise of the aqueous phase through dispersion therein, which additionally improves the distribution of the extraction agent in the flowing out over the overflow rim 14.

The volume of the widening 10 advantageously is greater than the pulsating volume of column 1. The distance of the lowermost perforated plate 15 in the widening 10 up to the overflow rim 14 preferably is only half the distance of the perforated plates 11 between each other.

With sufficiently thick columns the last connections 12 at the lower part 3 of the column 3 also can be replaced, if a discharge tube 13 is supplied through the central tube 2, through which there can be drawn off the aqueous (heavy) phase from the bottom of the column.

This pulsation principle is also usable with columns having central absorber rods according to German patent application No. P 2923870.8 and related Vietzke U.S. application No. 157,081 filed June 6, 1980. The entire disclosure of the Vietzke U.S. application is hereby incorporated by reference and relied upon. Such absorber rods with greater diameters in the middle can be free from neutron poisons besides because only a certain thickness layer of the neutron poison is active and absorbed. The construction of a central feed/pulsation tube in the absorber rod therefore is possible with columns that are not very small. The column of the invention can also be used for extracting fission products.

The following examples explain the invention in greater detail.

EXAMPLE 1

An extraction column with widened settling chambers at the top and bottom ends with a degree of enrichment of 3% in U235, based on uranyl nitrate, had a reliable nominal width in the widened top and bottom pieces of 492 mm and in the middle portion of 284 mm.

At normal throughput for pulsating there is necessary a pulsation volume of 1.4 l/stroke. The central pulsation tube 2 is formed here with an NW 40 (diameter in mm) of 40, the widening 10 in the bottom portion 3 is formed to an NW 100 with a length of 250 mm.

This widened pulsating tube piece 10 has a volume of 1.9 liters while the pulsating volume is only 1.4 l/stroke. In this NW 100 widened part 10 there are arranged 3–4 perforated plates of the same thickness of metal and hole size with the same spacing as in volume part 1, whereby the lowermost perforated plate only has half the perforated plate distance from the overflow rim 14. The hydraulic chambers (8 and 9) must be provided for the formation of the separatory layers and each must be able to receive at least 6 liters, i.e. two cylindrical tubes NW 150 by 400 mm high, which are joined at the bottom via a tube having a NW 40. Regulable pulsation pumps having a working point of 1.4 l/stroke are available. A tube 13 of NW 10 is sufficient to lead off the extracted aqueous solution. It is located centrally in the pulsating tube 2.

EXAMPLE 2

An extraction column for a throughput of 8 t/d (metric tons per day) of uranium in the form of uranyl nitrate with an enrichment of 4% U-235 is only critically safe with a neutron absorber rod. It has about the following dimensions.

Column middle part NW 580=580 mm diameter
Top and bottom parts NW 945=945 mm diameter
Central absorber rod
In the middle part NW 195=195 mm diameter
In the top and bottom parts=560 mm diameter
Pulsation volume/stroke=5.6 l/stroke Here, there is inserted centrally through the neutron absorber rod a feed-pulsating tube 2 of NW 80 which is widened as a bottom part 3 to NW 170 and in this width must have a length of 300 mm. The volume of the lower widening of NW 170 is 6.8 liters, the pulsation volume, however, is only 5.6 liters. Beginning half the distance from the lower rim, as the spacing between the plates, there are built in in this pulsation tube 3–4 perforated plates of the same construction and of the same uniform spacing from each other as in the column part 1 in order to disperse the extraction agent fed in into the aqueous phase sucked in during the pulsations.

The hydraulic chambers (8 and 9) must each have a volume of 18 liters, for example round cylinders of NW 220 and having a height of 500 mm which are joined at the bottom via a tube of NW 80. For the withdrawal of the extracted aqueous phase a tube 13 of NW 20 which is arranged centrally in the pulsating tube 2 is sufficient.

The entire disclosure of German priority application P 2941608.8-41 is hereby incorporated by reference.

What is claimed is:

1. A combination comprising an extraction column suitable for use with fissionable and/or fertile material, especially for the reprocessing of spent fuel elements, said combination comprising said extraction column, a centrally disposed inlet tube in said column, said column containing at least extraction agent and a material to be extracted, pulsating pump means, sealing liquid container means comprising at least two interconnected hydraulic cylinders connecting said centrally disposed inlet tube and said pump means, said cylinders hydraulically connected by a sealing liquid which separates two other liquids not miscible with said sealing liquid, said inlet tube having a widened portion in the lower portion of said tube and containing a plurality of vertically spaced and perforated plates in said widened portion, and an extraction agent inlet to the hydraulic cylinder connected to said inlet tube.

2. The combination of claim 1 including a second tube disposed in said inlet tube adapted to withdraw an extracted aqueous phase from the column.

3. The combination of claim 2 wherein the volume of said widened portion of said inlet tube is larger than the pulsating volume.

4. The combination of claim 3 wherein the lowermost perforated plate of said widened portion of said inlet tube is located half the distance from the bottom, overflow rim of said inlet tube that said perforated plates are spaced from each other.

5. The combination of claim 4 wherein said sealing liquid container means contains a sealing liquid not miscible with said extraction agent, the portion connecting with said column contains extraction agent, and the portion connecting with said pump means contains a sealing liquid non-miscible or combinable with the fissionable and fertile materials.

* * * * *